Jan. 8, 1929.
R. M. CRAIG
1,698,222
METHOD OF AND MEANS FOR PRODUCING TRANSFORMATION EFFECTS
Original Filed Dec. 29, 1925  4 Sheets-Sheet 1
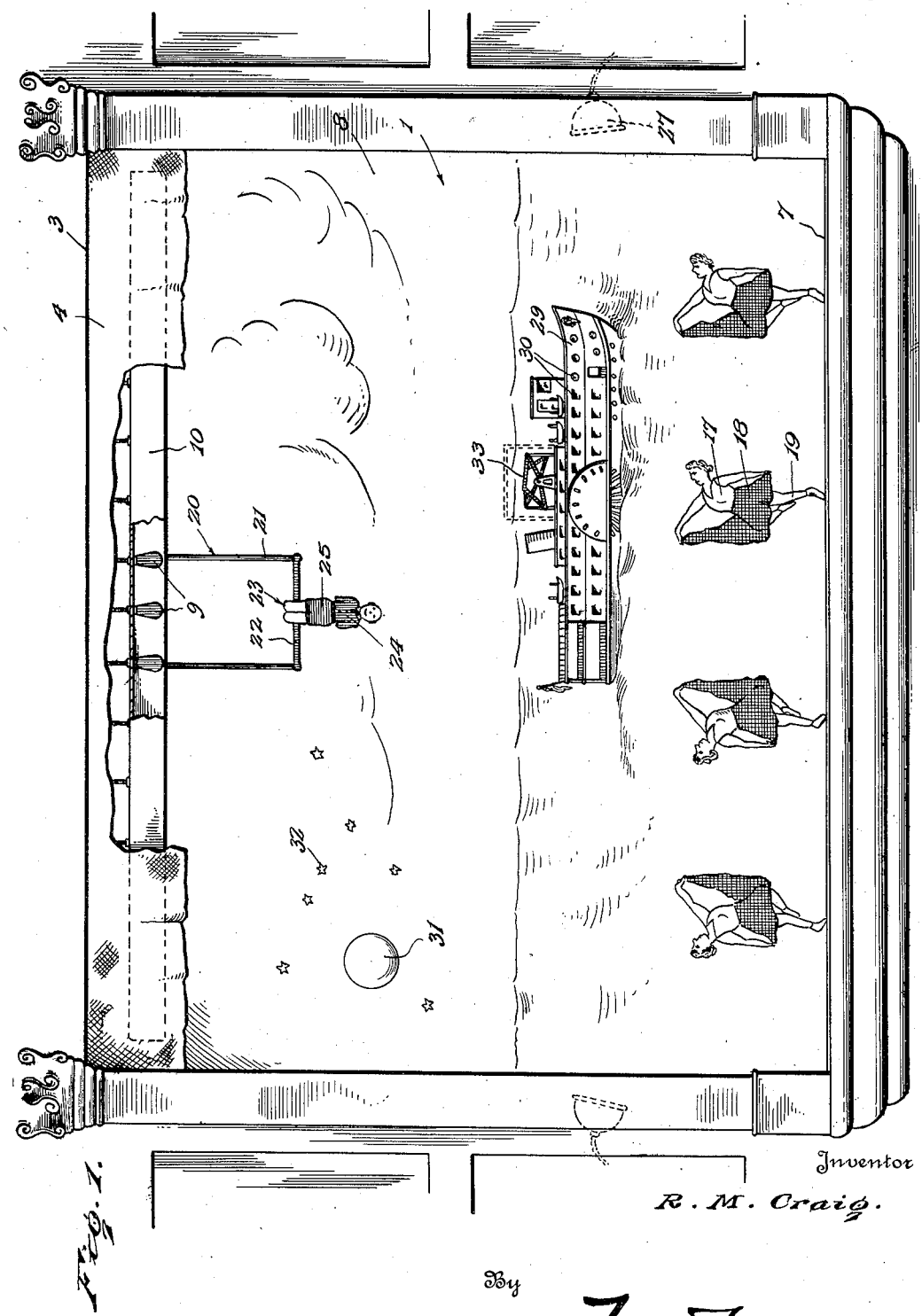
Inventor
R. M. Craig.
By Lacey & Lacey, Attorneys Jan. 8, 1929.　　　　　　　　　　　　　　　　　　1,698,222
R. M. CRAIG
METHOD OF AND MEANS FOR PRODUCING TRANSFORMATION EFFECTS
Original Filed Dec. 29, 1925　　　4 Sheets-Sheet 2
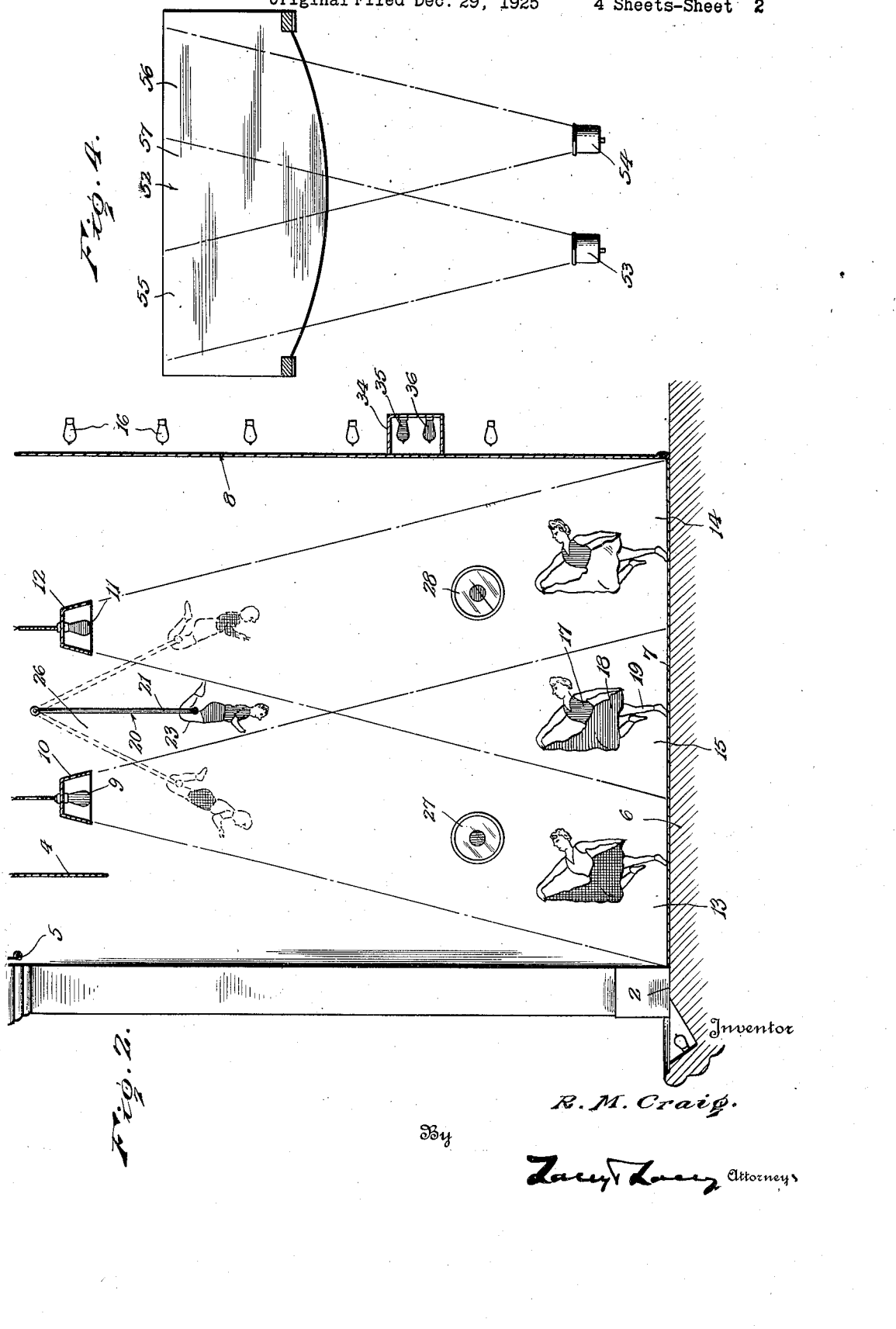

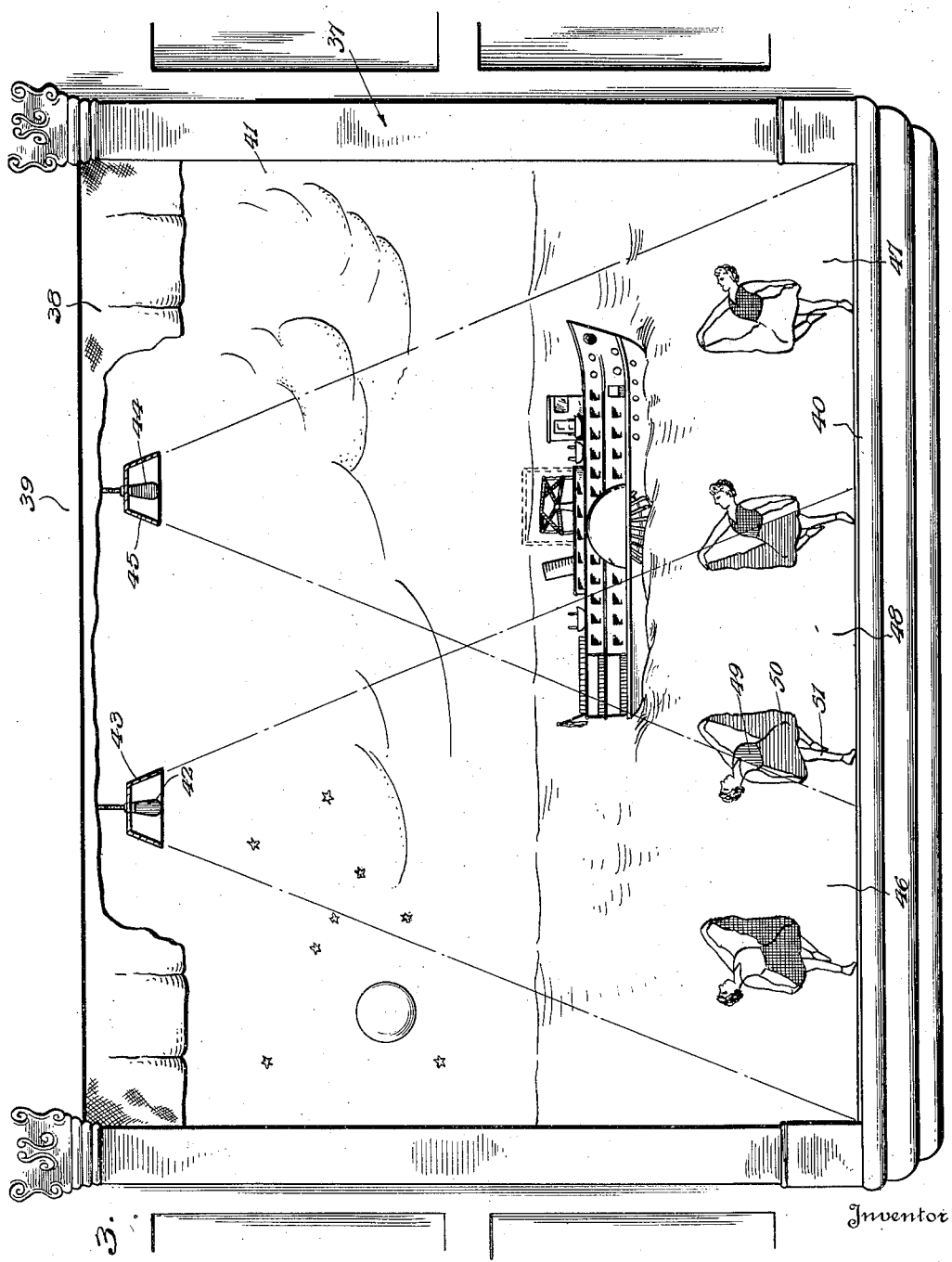

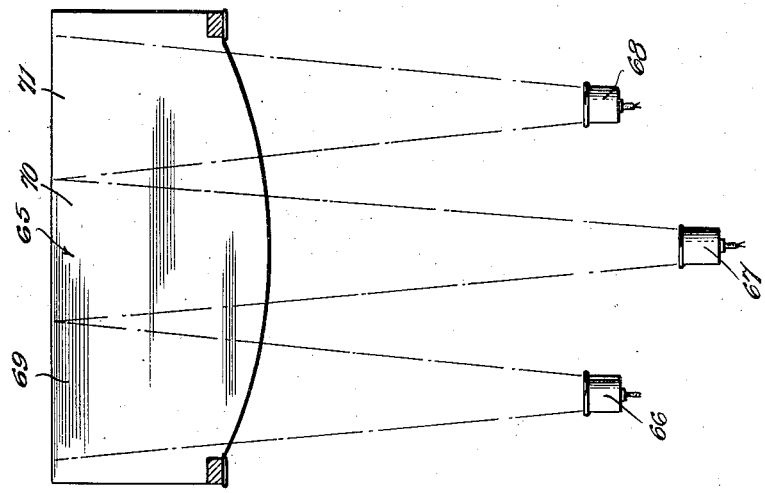

Patented Jan. 8, 1929.

1,698,222

UNITED STATES PATENT OFFICE.

RICHARD M. CRAIG, OF SAN ANTONIO, TEXAS.

METHOD OF AND MEANS FOR PRODUCING TRANSFORMATION EFFECTS.

Application filed December 29, 1925, Serial No. 78,247. Renewed May 4, 1928.

This invention relates to a novel method of producing theatrical transformation effects and has as its general object to provide means whereby the effect of change in the costumes of actors and actresses, and the general appearance of moving objects, in general, may be accomplished in a mystifying and startling manner.

Another object of the invention is to provide means whereby the transformation effects above referred to may be accomplished without the nature of the medium through which the results are obtained being apparent to the audience.

In Patent No. 1,428,008 granted to me September 5, 1922, there is disclosed a method of and apparatus for producing transformation effects upon a stage and in accordance with the method disclosed in said patent, the entire stage is at one moment flooded with a light of one spectral color and due to the principles of color absorption, portions of the scenery upon the stage are rendered visible and, by flooding the stage, at another period, with light rays of another spectral color, the scenic effect is entirely changed without any rearrangement of the scenery, due to the obliteration of the previously displayed portions of the scenery and the display of such other portions as were previously not visible. Under the patented method, however, while changes in scenic effect are produced through a change in the color of the light rays under which the scenery is displayed, the present invention contemplates a novel method of and means for producing even more startling and more mystifying effects without the necessity of changing the character of the illumination, and more specifically the invention contemplates so illuminating the stage area that actors and actresses in variously colored costumes will be completely changed in appearance as they move about over the stage, without the means whereby such results are obtained being in any way apparent to the audience. In general, the invention contemplates displaying the effect of change in appearance of animate or inanimate objects moving from one place to another about the stage area, under a constant selected arrangement of sources of illumination possessing different color characteristics.

In the accompanying drawings,

Figure 1 is a view in front elevation of a stage, the view illustrating in a general way the arrangement of the light sources and the means whereby the result referred to above may be obtained;

Fig. 2 is a vertical front to rear sectional view illustrating more particularly the manner in which the light sources are arranged and the manner in which the different effects are obtained.

Fig. 3 is a view similar to Fig. 1 illustrating another arrangement of the sources of illumination whereby similar results may be obtained;

Fig. 4 is a diagrammatic view illustrating another manner in which the stage may be illuminated to produce the desired result;

Fig. 5 is a view illustrating the employment of a source of white light rays in combination with a source of colored spectral rays;

Fig. 6 is a view similar to Fig. 5 illustrating the manner in which spectral light rays of three substantially complementary colors may be employed so as to produce a greater variety of changes in the appearance of the actors and actresses or inanimate objects moving about the stage.

Figures 1 and 2 of the drawings illustrate one application of the principles of the invention and in these figures the numeral 1 indicates in general the stage, above the proscenium 2 of which there is constructed the usual arch 3, the numeral 4 indicating the usual shallow drop or curtain which is suspended immediately in rear of the arch, the curtain proper being indicated by the numeral 5. The stage floor is indicated by the numeral 6 and, in accordance with the present invention is preferably covered with a carpet or any other suitable floor covering 7 which is of a dark neutral color, or the floor surface itself may be finished in such a color, and by a neutral color is meant a color which does not change materially under spectral light rays of complementary or distinctive colors. The purpose of providing the floor of the stage with a covering of a dark neutral color will presently be made apparent. Examples of dark neutral colors are dark gray, black, tobacco brown, Indian red, etc. At the back of the stage there is suspended a back drop 8 upon which is painted or otherwise depicted any suitable scene, and the characteristics of this back drop and its purpose will presently be more fully explained.

In this particular embodiment of the invention the stage in general is flooded with light rays of complementary spectral colors, and by the word "stage" I have reference to the floor surface of the stage and the space above the floor surface. In order that the stage may be thus illuminated, a row of red light bulbs 9 is arranged at the top of the stage behind and parallel to the shallow curtain or drop 4 and these bulbs are preferably arranged within a trough-like reflector 10 so formed that the red light rays will be reflected onto the floor of the stage over an area extending the entire width of the stage and from the proscenium 2 to a point in rear of the proscenium and spaced from the back drop 8 a distance equal substantially to, for example, one-third of the depth of the stage. A row of blue light bulbs or blue-green bulbs 11 is likewise arranged within a trough-like reflector 12 supported in rear of and parallel to the reflector 10 and in such position that the blue light rays will be reflected onto the stage floor over an area extending the entire width of the stage and from the back drop 8 to a point in rear of the proscenium. Any desired number of red and blue light bulbs may be employed and by reference to Fig. 2 of the drawings it will be observed that the rays from the two sources of illumination blend or overlap so that there are upon the floor of the stage, in effect, three distinct illuminated areas of substantially equal dimensions and extending entirely across the stage; namely, the illuminated area next adjacent the proscenium which is red because of the location of the red light sources of illumination nearer the front of the stage than the blue light sources of illumination; second, a blue light area which is located nearer the rear of the stage, and a white light area which is intermediate the red and blue light areas, these three areas being indicated respectively by the numerals 13, 14 and 15. It will be understood that the white light area is provided through a composition of the red and blue complementary light rays which combination produces artificial white light. It will also be evident by reference to Fig. 2 of the drawings that the red light rays are reflected through a portion of the space above the stage floor, as are also the blue light rays, and that objects in the path of these rays will be illuminated thereby. It will also be apparent that objects in the path of the blending red and blue light rays will be illuminated by artificial white light. It will also be quite evident that the light rays from the sources of illumination will not be visible to the audience except such of the rays as are incident upon an object in the path of the rays. While reference has been made to illuminated areas 13, 14 and 15, each of a different spectral color, such areas do not exist in fact, in the sense that they are visible to the audience, for if the floor surface is of a dark neutral color, the incident rays will be absorbed and the entire surface will appear of a substantially uniform neutral color throughout. Furthermore it is contemplated that the back drop 8 be substantially semi-translucent and that it be illuminated from the rear by white light bulbs indicated by the numeral 16. It will be evident that due to the illumination of the back drop 8 and the arrangement of sources of blue light illumination next adjacent the said back drop, the appearance of the stage being illuminated in the ordinary manner, so far as the audience is concerned, is further enhanced, and as stated, the medium through which the transformation effects are produced will not be visible to the audience.

In the said Figs. 1 and 2 actresses are illustrated in dancing postures upon the stage, and, as a specific example of the invention, the dancers are clothed in costumes possessing distinctive color characteristics. As a specific example, each of the dancers might be dressed in a bodice 17 which is red in color, and in a skirt 18 which is blue in color, and the stockings 19 may be white in color. Therefore different parts of each dancer's costume are of contrasting colors and they will appear in their true colors under white light rays. It will be observed that in this particular instance the pigment colors in which the articles of apparel are displayed correspond to the spectral colors under which the stage is illuminated. By referring to Fig. 2 of the drawings it will be observed that red light and blue light zones 13 and 14 are established and extend between the sources of illumination and the stage floor and that a white light zone 15 extends above the stage floor to a point where the red and blue light rays mingle or are blended. Therefore, when any one of the dancers is performing in the white light zone 15, her costume will appear in its natural or actual pigment colors, namely her bodice 17 in red, her skirt 18 in blue, and her stockings 19 in white. As any one of the dancers moves into the red light zone 13, for example, the bodice 17 of her costume will appear a brilliant white under the red light rays, her skirt 18 will appear substantially black, and her stockings will appear a light red. On the other hand, as any dancer enters the blue light zone 14, the bodice 17 of her costume will appear substantially black, her skirt substantially white and her stockings a light blue. Therefore as the dancers dance backwardly and forwardly upon the stage, it will appear to the audience that their costumes are constantly changing and it will be evident that by a proper selection of pigment colors and by having some parts of the costumes of colors and tints in the red end of the spectrum and other parts of the costumes blue or other colors and tints near the other end of the spectrum, many pleasing color effects may be obtained. At this point it will be evident that colors other than red and blue may be employed for the purposes of illumination, provided the selected colors are in contrast to each other or substantially complementary so that, when blended, they will produce artificial white light. It will also be evident that the sources of illumination might be so placed as to provide only illuminated zones of different spectral colors, thereby dispensing with the white light zone 15.

In the foregoing description reference has been made to the appearance of transformation of animate objects moving upon the floor of the stage, but inanimate movable objects might be presented through illumination under contrasting spectral rays, and, if represented in suitable pigment colors, might be made to apparently automatically change their appearance while being moved over the floor of the stage. Furthermore, as illustrated in Figs. 1 and 2, the transformation effect may take place a considerable distance above the stage floor surface as for example in the instance of a trapeze performer, and in these figures the numeral 20 indicates in general a trapeze including suspension ropes 21 which may for example be red in color, and a trapeze bar 22 which may likewise be red in color. In these figures, the trapeze performer indicated by the numeral 23, is clothed for example in a red shirt 24 and blue trunks 25. In this example of the application of the principles of the invention, the trapeze is so suspended that the trapeze together with the trapeze performer may, in swinging back and forth, at different periods, occupy the red light zone 13, and the blue light zone 14 and a zone 26 intermediate the red and blue light zones and vertically above the white light zone 15. Therefore, when the trapeze performer and trapeze are in the intermediate position shown in full lines in Figs. 1 and 2 of the drawings, the suspension ropes 21 of the trapeze as well as the cross bar 22 thereof, and also the performer will be visible to the audience, the suspension ropes and cross bar of the trapeze appearing red, the shirt of the performer appearing red, and the trunks of his costume appearing blue. However, as the performer swings toward the front of the stage and into the red light zone 13, the lower portions of the suspension ropes of the trapeze as well as the trapeze bar will apparently disappear from view, the performer's shirt 24 will appear substantially white, and the trunks 25 of his costume would appear substantially black. Thus in this altered costume, the performer appears at this moment to be suspended in space without any visible means of suspension, and the effect is of course a startling one. As the performer swings rearwardly and into the blue light zone 14, the lower portions of the trapeze suspension ropes 21 will appear substantially black as well as also the cross bar 22 of the trapeze, the trunks of his costume will appear substantially white, and the shirt of his costume will appear substantially black. It will be evident therefore that the invention is not restricted to transformation effects as related to animate or inanimate objects upon the stage floor, but may be equally well applied to the display of apparent transformation of animate or inanimate objects moving in any part of the stage area above the floor.

In this application of the principles of the invention the sources of colored light illumination are arranged near the top of the stage and concealed from view of the audience by the reflectors as well as the front drop 4, and if desired, this illumination may be supplemented by spot lights 27 and 28 arranged in the wings of the stage and respectively red and blue in color so as to cast red and blue light rays across the stage from the opposite sides thereof.

The back drop 8 may have represented upon it in any suitable pigment colors, any desired or appropriate scene, such for instance as an ocean scene, a ship 29 being represented as a part of the scene, and if desired, the portholes and windows of the ship may be substantially transparent or semi-transparent. Likewise the moon may be represented, as at 31, as a part of the scene and the area occupied by the representation may be substantially transparent as may also the smaller areas 32 representing stars.

Assuming that the representation 29 is that of a steamship of the excursion type, the walking beam thereof may be represented upon the surface of the drop curtain in two different positions as indicated by the numeral 33, one representation being in red and the other in blue, blue-green or green. Then, behind the drop curtain there may be arranged a compartment 34 containing red and blue light bulbs indicated respectively by the numerals 34 and 36, the compartment having an open front presented directly to the rear surface of the drop curtain, means (not shown) being provided for successively lighting the bulbs to produce the effect of rocking movement of the walking beam in accordance with the well known principles of color absorption.

Figure 3 of the drawings illustrates another application of the principles of the invention and in this figure the stage is indicated in general by the numeral 37, the front drop corresponding to the drop 4, is indicated by the numeral 38, the arch of the stage by the numeral 39, and the floor of the stage by the numeral 40, the back drop corresponding to the back drop 8 of the previously described form being indicated by the numeral 41 and bearing a scenic representation such for example as that heretofore described. In this figure the numeral 42 indicates a series of red light bulbs arranged within a reflector 43 and extending in a series in a direction from front to rear of the stage at one side of the middle thereof. The numeral 44 indicates a series of blue light bulbs which are arranged within a reflector 45 and in a series or row extending parallel to the series of bulbs 42 and at the other side of the middle of the stage. The arrangement of the two sets of bulbs is such that the rays from the red light bulbs 42 will be reflected downwardly to cover a zone of the floor surface extending from the side of the stage near which said bulbs are located and in the direction of the middle of the stage, the rays from the blue light bulbs being similarly reflected downwardly to flood a portion of the floor area of the stage extending from the side of the stage near which the said blue light bulbs are located and in the direction of the middle of the stage. As in the previously described embodiment of the invention, the reflected red and blue light rays will mingle or overlap in the center of the stage and therefore the floor surface of the stage and space above the floor surface will be divided into a red light zone 46, a blue light zone 47, and an intermediate artificial white light zone 48. However, instead of extending transversely of the stage, these light zones extend in a direction from front to rear of the stage so that as dancers or other performers or actors move across the stage from side to side, they pass through the different light zones whereas in the previously described embodiment of the invention they passed through such zones in moving across the stage from front to rear thereof. As in the previously described embodiment of the invention, each dancer may be clothed in a costume the bodice of which is for example red in color and indicated by the numeral 49, the skirt blue indicated by the numeral 50, and the stockings white as indicated by the numeral 51. By reference to Fig. 3 it will be observed that as any one of the dancers enters the red light zone 46 the bodice of her costume will change to white and her skirt will appear substantially black and her stockings light red. As any one of the dancers enters the blue light zone 47 her bodice will apparently change to black and her skirt to white, her stockings appearing a light blue, and as any one of the dancers enters the white light zone 48, her costume will appear in natural colors.

As in the previously described embodiment of the invention, the principles exemplified in Fig. 3 of the drawings may be adapted to the display of inanimate as well as animate objects, and various combinations of pigment and spectral colors may be employed as well as various tints thereof.

In the applications of the principles of the invention above described, the sources of illumination have been confined to the stage, but by reference to Fig. 4 of the drawings, it will be observed that the stage, indicated in general by the numeral 52, may be flooded with red light rays from a source of red light 53, and with blue light rays from a source of blue light 54, both located, for example, in one of the galleries of the theatre or auditorium, the red and blue light rays being directed onto the stage in such manner that the rays will blend thereby providing a red light zone 55, a blue light zone 56, and a white light zone 57.

In the embodiment shown in Fig. 4 as well as the previously described embodiments, the white light zone has in each instance been produced through a combination of spectral rays of contrasting colors, but in Fig. 5 of the drawings there is schematically illustrated an embodiment in which red light rays from a red light source 58, blue light rays from a blue light source 59, and white light rays from a white light source 60 are projected onto the stage 61 so as to establish a red light zone 62, a blue light zone 63, and an intermediate white light zone 64.

Fig. 6 of the drawings illustrates an application of the principles of the invention in which three contrasting colored light ray sources are employed and in this figure the numeral 65 indicates the stage and the numerals 66, 67 and 68, indicate respectively yellow-green, blue-violet, and red light ray sources which are located for example in one of the galleries of the theatre, or these sources may be equidistantly arranged at the top of the stage in the general manner illustrated in Figs. 1 and 2, or in Fig. 3 without, however, any overlapping of the rays or blending thereof. Thus there are established, within the stage area a yellow-green light ray zone 69, a blue-violet light ray zone 70, and a red light ray zone 71. This embodiment of the invention is not restricted to the spectral colors referred to, but any appropriate selection of substantially contrasting spectral colors may be employed, and it will be understood that the pigment colors in which animate and inanimate objects are displayed upon the stage may be selected accordingly, so that an almost unlimited variety of color changes may be effected by a proper selection of spectral and pigment colors. In this embodiment the light ray sources may be arranged at the top of the stage or in any other appropriate place so as to establish the colored light ray zones.

It will be evident that the principles of the invention may be embodied in displays for carnivals, cabarets, dance halls, etc., and that the invention is therefore not restricted to theatrical transformation effects.

With regard to the back drop in the forms of the invention shown in Figs. 1 and 2 of the drawings and Fig. 3, it will be evident that this drop is illuminated to an extent to wash out any stray colored light rays which might otherwise fall upon the surface of the drop but that the illumination is not sufficiently intense to noticeably cast any white light rays upon the performers. Furthermore, this partly illuminated drop imparts to the stage setting the appearance of an ordinary stage setting and therefore further tends to obscure the presence of the colored light rays and render the same invisible to the audience.

Having thus described the invention, I claim:

1. The method of displaying transformation effects which comprises establishing illuminated zones of different spectral colors, and displaying moving objects, represented in different pigment colors, under the light rays in said zones as the objects pass from one zone to another.

2. The method of displaying transformation effects which comprises establishing illuminated zones of contrasting spectral colors and displaying moving objects, represented in different contrasting spectral colors, under the light rays in said zones as the objects pass from one zone to another.

3. The method of displaying transformation effects which comprises flooding adjacent zone spaces with light rays of different spectral colors, and displaying moving objects, represented in different pigment colors, under the light rays in said zones as the objects pass from one zone to another.

4. The method of displaying transformation effects which comprises flooding adjacent zone spaces with light rays of contrasting spectral colors, and displaying moving objects, represented in contrasting pigment colors, under the light rays in said zones as the objects pass from one zone to another.

5. The method of displaying transformation effects which comprises flooding adjacent zone spaces with light rays of complementary spectral colors in a manner to effect partial blending of the rays and thereby establish light ray zones corresponding to the spectral colors and an artificial white light zone, and displaying moving objects, represented in different pigment colors, under the light rays in said zones as the objects pass from one zone to another.

6. Means for displaying the effect of transformation of moving objects comprising a defined surface with relation to which the objects, represented in pigment colors, are to move, and sources of colored light rays relatively arranged to transmit their rays to relatively adjacent zone spaces in the general direction of said surface.

7. Means for displaying the effect of transformation of moving objects comprising a defined surface with relation to which the objects, represented in pigment colors, are to move, and sources of complementary colored light rays relatively arranged to transmit their rays through relatively adjacent zone spaces in the general direction of said surface and thereby establish light ray zones of colors corresponding to the sources and another light ray zone which is a composition of the original colored light rays.

8. Means for displaying transformation effects comprising sources of light rays of contrasting colors arranged with respect to each other to establish colored light ray zones, whereby objects represented in contrasting pigment colors and moving from one to another of said zones will present changes in color appearance.

9. Means for displaying the effect of transformation of moving objects comprising a defined surface of a neutral pigment color with relation to which the objects, represented in distinctive pigment colors, are to move, and sources of contrasting colored light rays relatively arranged to transmit their rays through relatively adjacent zone spaces in the general direction of said surface.

10. Means for displaying the effect of transformation of moving objects comprising a defined surface of a dark neutral color with relation to which the objects, represented in distinctive pigment colors, are to move, a partly illuminated scenic background in advance of which the first mentioned surface is located, and sources of colored light rays relatively arranged in advance of said background to transmit their rays through relatively adjacent zone spaces in the general direction of said surface.

11. Means for displaying the effect of transformation of moving objects comprising a defined surface of a dark neutral color with relation to which the objects, represented in distinctive pigment colors, are to move, a partly illuminated scenic background in advance of which the first mentioned surface is located, and sources of colored light rays relatively arranged in advance of said background to transmit their rays through relatively adjacent zone spaces in the general direction of said surface, the arrangement of the light ray sources being such that the rays therefrom will blend whereby to establish a light ray zone which is a composite of the original rays.

In testimony whereof I affix my signature.

RICHARD M. CRAIG.